United States Patent
Yeh et al.

(10) Patent No.: US 7,920,646 B2
(45) Date of Patent: Apr. 5, 2011

(54) METHOD FOR SELECTING SWITCHED BEAM USING PILOT SIGNAL AND SYSTEM THEREOF

(75) Inventors: Choong-Il Yeh, Daejeon (KR); Young-Seog Song, Daejeon (KR); In-Kyeong Choi, Daejeon (KR); Dong-Seung Kwon, Daejeon (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 842 days.

(21) Appl. No.: 11/722,049

(22) PCT Filed: Dec. 21, 2005

(86) PCT No.: PCT/KR2005/004422
§ 371 (c)(1),
(2), (4) Date: Jun. 18, 2007

(87) PCT Pub. No.: WO2006/068413
PCT Pub. Date: Jun. 29, 2006

(65) Prior Publication Data
US 2008/0095251 A1   Apr. 24, 2008

(30) Foreign Application Priority Data

Dec. 21, 2004  (KR) .................. 10-2004-0109420
Dec. 15, 2005  (KR) .................. 10-2005-0123797

(51) Int. Cl.
*H04L 27/00* (2006.01)
(52) U.S. Cl. ...................................... 375/299

(58) Field of Classification Search .............. 375/296, 375/299
See application file for complete search history.

(56) References Cited

U.S. PATENT DOCUMENTS

| | | | |
|---|---|---|---|
| 6,470,195 B1 | 10/2002 | Meyer | |
| 6,594,226 B1 * | 7/2003 | Benning et al. | 370/208 |
| 6,795,018 B2 | 9/2004 | Guo | |
| 7,046,978 B2 * | 5/2006 | Burke et al. | 455/272 |

(Continued)

FOREIGN PATENT DOCUMENTS

EP   1 315 311 A1   5/2003

OTHER PUBLICATIONS

R. Roy, et al., "ESPRIT-Estimation of signal parameters via rotational invariance techniques", IEEE Trans. on Acoustics, Speech ... vol. 37, No. 7, Jul. 1989, pp. 984-995.

(Continued)

*Primary Examiner* — Kevin Y Kim
(74) *Attorney, Agent, or Firm* — Jefferson IP Law., LLP

(57) ABSTRACT

The present invention relates to a system for selecting a switched beam for supplying a maximum received power to a subscriber station, and a method thereof. The number of switched beams used by a base station is limited, and a weight value vector for forming the switched beam is predefined. The subscriber station uses a pilot signal for discerning transmitting antennas to estimate channel values for the respective transmitting antennas, and uses the channel values and the predefined weight value vectors to determine a switched beam for supplying a maximum signal-to-noise ratio (SNR). The subscriber station notifies the base station of an identifier of a selected beam by using a feedback channel, and the base station uses the switched beam to transmit traffic data.

8 Claims, 8 Drawing Sheets

U.S. PATENT DOCUMENTS

| | | | |
|---|---|---|---|
| 7,099,630 B2 | 8/2006 | Brunner et al. | |
| 7,099,634 B2 * | 8/2006 | Tanaka | 455/101 |
| 7,139,328 B2 * | 11/2006 | Thomas et al. | 375/299 |
| 7,499,499 B2 * | 3/2009 | Gollamudi | 375/295 |
| 7,583,723 B2 * | 9/2009 | Heikkila | 375/148 |
| 2002/0012333 A1 * | 1/2002 | Yoshida et al. | 370/335 |
| 2002/0080743 A1 * | 6/2002 | Morita et al. | 370/335 |
| 2003/0228857 A1 | 12/2003 | Maeki | |
| 2004/0063468 A1 * | 4/2004 | Frank | 455/561 |
| 2004/0184428 A1 | 9/2004 | Im | |

OTHER PUBLICATIONS

Q.T. Zhang, "A statistical resolution theory of the beamformer-based spatial spectrum for determining the directions of signals in white noise" IEEE Trans. on Signal Processing, vol. 43, No. 8, Aug. 1995 pp. 1867-1873.

* cited by examiner

METHOD FOR SELECTING SWITCHED BEAM USING PILOT SIGNAL AND SYSTEM THEREOF

BACKGROUND OF THE INVENTION (a) Field of the Invention

The present invention relates to a system for selecting a switched beam by using a plurality of antennas, and a method thereof. More specifically, the present invention relates a system for efficiently selecting a switched beam with a lesser error rate by performing less calculation, and a method thereof.

(b) Description of the Related Art

FIG. 1 shows a schematic diagram for representing an operation of a switched beam.

A switched beamforming method is one of smart antenna methods, in which a directional beam is provided toward a mobile terminal since a plurality of antennas respectively have different weight values so as to provide maximized received power to the mobile terminal.

A base station 100 includes a plurality of antenna elements 101, 102, and 103 for each sector. A mobile subscriber station 200 transmits and receives traffic data to/from the base station while moving around in a sector.

As described above, when the different weight values are respectively provided to the antenna elements 101, 102, and 103 of the base station to provide an optimized received power to the subscriber station, a beam radiated by the antenna is formed in a direction of the subscriber station.

Here, a weight value vector for the antenna element according to a beamforming direction is defined by a predetermined number, and is selected for forming a beam in an appropriate direction.

Therefore, since a directional beam that is narrower than a sector antenna is used when the above switched beamforming method is used, a beamforming gain and co-channel interference may be reduced, and system performance may be improved.

In addition, in the switched beamforming method according to the prior art, the base station arranges beamforming weight value vectors, and uses an uplink signal transmitted from the subscriber station to estimate a direction of arrival (DOA) of the uplink signal to the base station.

The base station uses the estimated DOA to determine an appropriate switched beam for the subscriber station, and transmits user traffic data by using the switched beam.

However, in the conventional switched beamforming method, sequential uplink signals of a predetermined subscriber station must be used to sequentially estimate the DOA of the signals transmitted by the predetermined subscriber station. Accordingly, resources are wasted since it is required to continuously provide the uplink signals to estimate the DOA. In addition, it is required to define an additional process to allocate uplink resources to the subscriber station so that the base station may estimate the DOA.

Furthermore, since the base station selects the switched beam for the beamforming direction, a load is increased at the base station, and a considerable length of uplink signal is used for each terminal to estimate the DOA. In addition, since an uplink frequency band and a downlink frequency band are apart from each other in frequency division duplex (FDD) method, an error occurs due to a frequency difference when the DOA estimated by using the uplink signal is used to select a downlink switched beam.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a system for selecting a switched beam by a subscriber station and reducing a load at a base station and an error due to a frequency distance, and a method thereof.

In addition, the present invention has been made in an effort to provide a system for selecting a switched beam for supplying a maximum signal-to-noise ratio (SNR) by using a common downlink pilot signal, and a method thereof.

In an exemplary switched beam selecting method of a subscriber station in a sector area of a base station having a smart antenna system forming a switched beam by a plurality of transmitting antennas according to an embodiment of the present invention, a pilot signal generated to discern the plurality of transmitting antennas and transmitted from the base station through a sector beam is received, channels for respective transmitting antennas are estimated by using the pilot signal, received signal-to-noise ratios (SNR) based on respective weight value vectors are calculated by using estimates of the estimated channels and the plurality of predetermined weight value vectors for forming the switched beam, a weight value vector corresponding to a maximum value is detected among the calculated received SNRs, and an identifier corresponding to the detected weight value vector is transmitted.

An exemplary base station having a smart antenna system forming a switched beam by using a plurality of transmitting antennas, the base station providing the switched beam to a subscriber station according to an embodiment of the present invention, includes a plurality of transmitting antennas, a pilot signal generator, a switched beam controller, a switched beam identifier receiving unit, and a base station controller. The plurality of transmitting antennas provide a directional beam that is narrower than a sector beam. The pilot signal generator generates a pilot signal to discern the plurality of transmitting antennas. The switched beam controller generates the switched beam providing the directional beam according to a predetermined weight value vector. The switched beam identifier receiving unit receives a switched beam identifier transmitted from the subscriber station (an identifier of a weight value vector selected by the subscriber station). The base station controller transmits the pilot signal through the sector beam and controls the switched beam controller to generate the switched beam based on switched beam identifier information received by the switched beam identifier receiving unit.

An exemplary subscriber station selecting a switched beam transmitted by a base station having a smart antenna system forming the switched beam by using a plurality of transmitting antennas according to an embodiment of the present invention includes a channel estimator, a weight value vector storage unit, a signal-to-noise (SNR) calculator, and a weight value vector determining unit. The channel estimator estimates channels for the respective transmitting antennas of the base station by using a received pilot signal. The weight value vector storage unit stores a plurality of weight value vectors for forming a sector beam and the switched beam having directionality that is narrower than the sector beam. The signal-to-noise ratio (SNR) calculator calculates received SNRs by using estimates of the estimated channel and the plurality of switched beam weight value vectors. The weight value vector determining unit determines a switched beam weight value vector used for estimating a maximum value among the calculated SNRs, and notifies the base station of an identifier of the determined weight value vector.

DETAILED DESCRIPTION OF THE EMBODIMENTS

Figure 1:
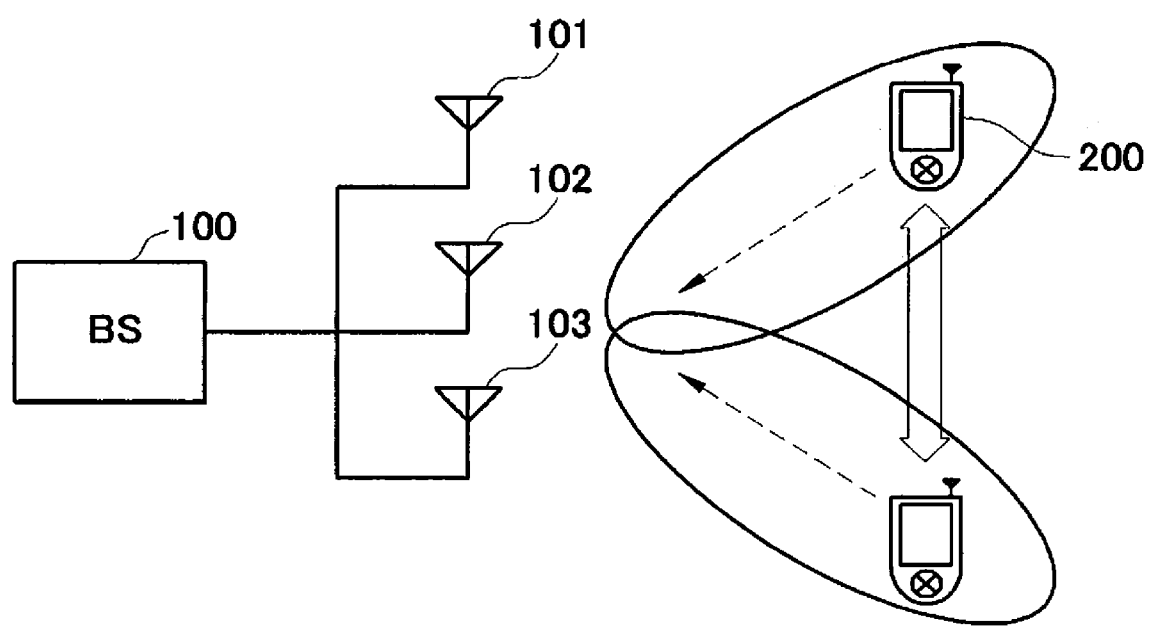
FIG. 1 shows a schematic diagram for representing an operation of a switched beam.

An exemplary embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, throughout this specification and the claims which follow, unless explicitly described to the contrary, the word "comprise" or variations such as "comprises" or "comprising" will be understood to imply the inclusion of stated elements but not the exclusion of any other elements.

A system for selecting a switched beam according to an exemplary embodiment of the present invention and a method thereof will be described with reference to the figures.

Figure 2:
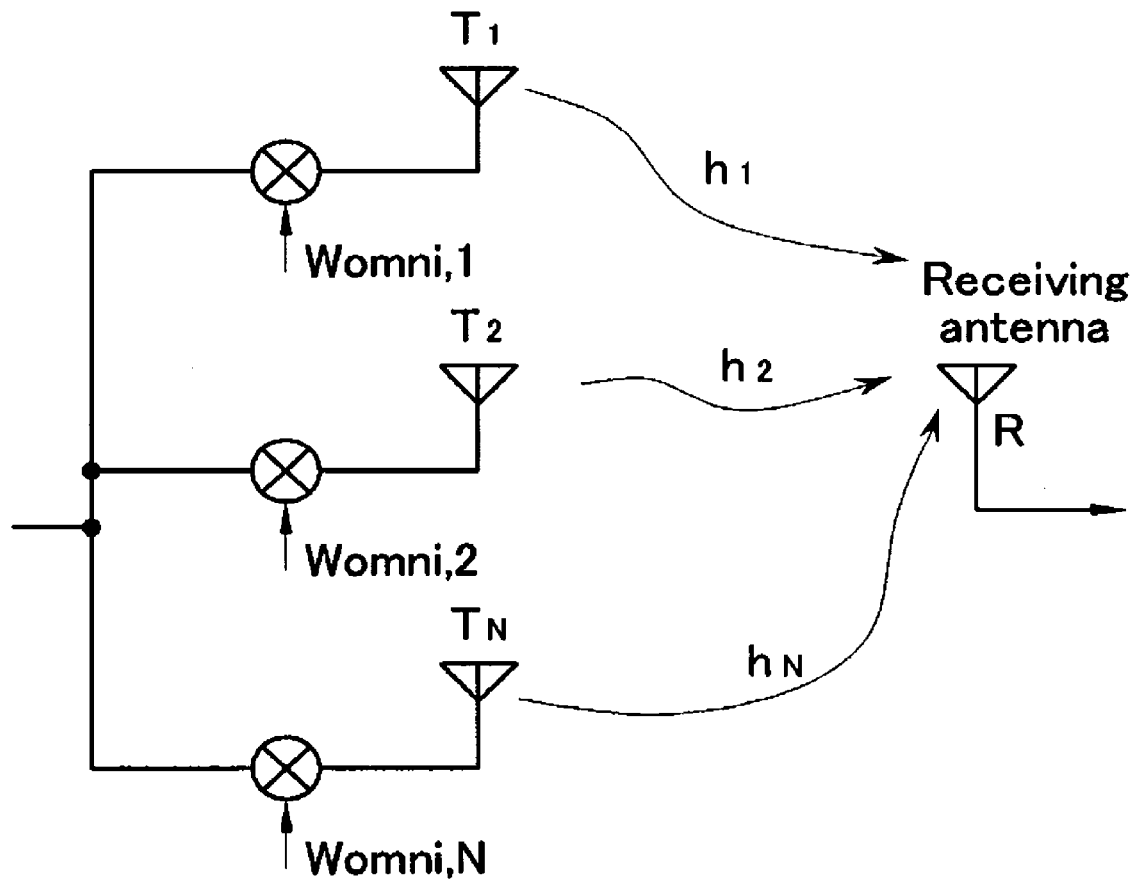
FIG. 2 shows a diagram of a configuration of a base station for forming a sector beam according to an exemplary embodiment of the present invention.

FIG. 2 shows a diagram of a configuration of a base station for forming a sector beam according to the exemplary embodiment of the present invention.

A transmitting antenna of the base station shown in FIG. 2 receives a weight value for forming a beam in every direction in a sector cell.

Base station transmitting antenna elements T1, T2, ..., TN have respective weight value vectors Womni, 1 ... Womni, N for respectively forming a sector beam, so as to form a common signal in every direction and radiate the common signal to every subscriber station in a sector.

A receiving antenna R of the subscriber station receives the sector beams formed based on the weight value vectors radiated through channels from the respective antenna elements in every direction according to a location of the receiving antenna.

Figure 3:
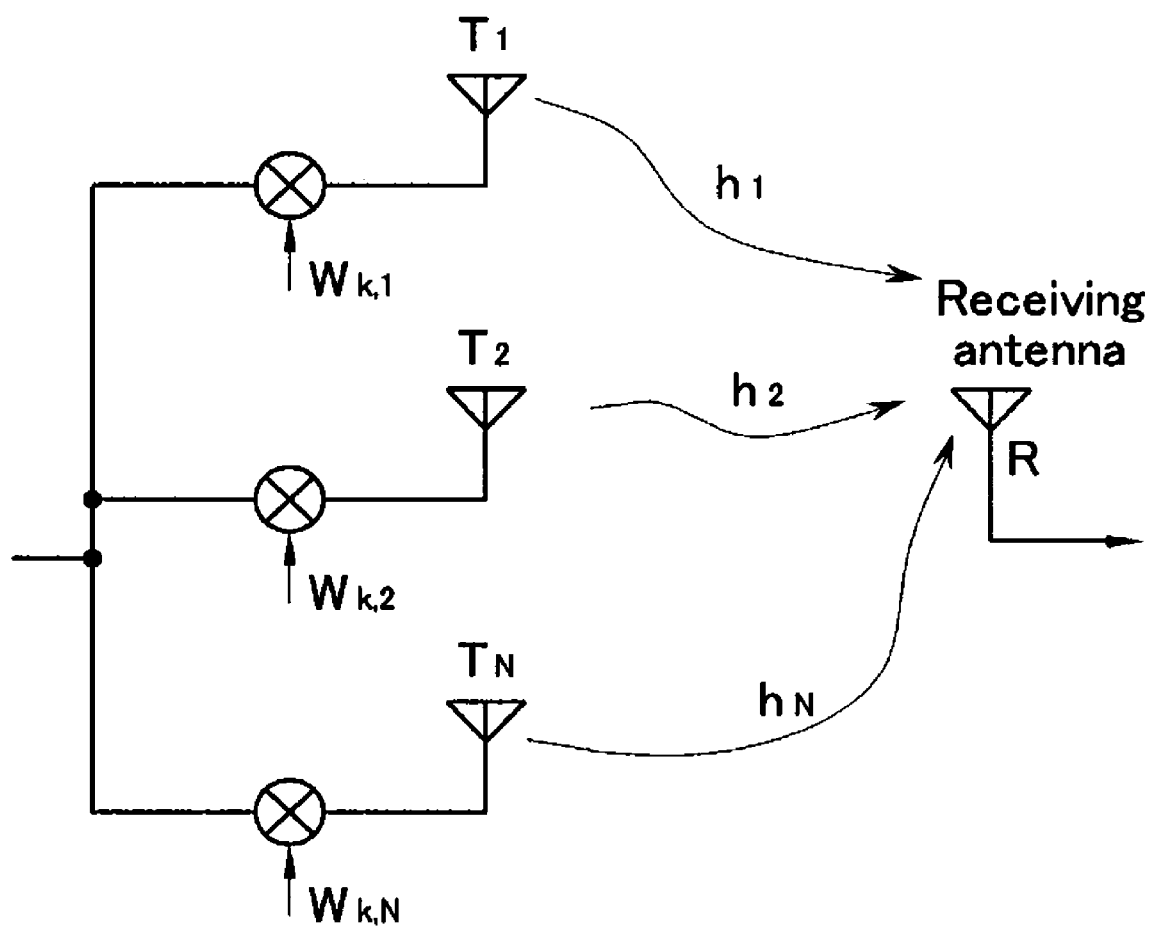
FIG. 3 shows a diagram of a configuration of the base station for forming a switched beam according to the exemplary embodiment of the present invention.

FIG. 3 shows a diagram of a configuration of the base station for forming a switched beam according to the exemplary embodiment of the present invention.

The transmitting antenna of the base station shown in FIG. 3 receives an antenna weight value for forming a switched beam having directionality that is narrower than the sector beam.

Predetermined number k weight value vectors Wk, 1 ... Wki, N are provided to the respective base station transmitting antenna elements T1, T2, ..., TN so as to radiate a directional beam to a predetermined subscriber station.

The weight value vector for forming the sector beam and the weight value vector for forming the switched beam may be given as Math FIG. 1.

$$W_{omni} = \begin{bmatrix} w_{omni,1} \\ w_{omni,2} \\ \ldots \\ w_{omni,N} \end{bmatrix}, W_k = \begin{bmatrix} w_{k,1} \\ w_{k,2} \\ \ldots \\ w_{k,N} \end{bmatrix}$$ [Math Figure 1]

The number of the weight value vectors is limited according to the number of beamforming directions, and the base station may provide the directional beam to the subscriber station according to an identifier of a predetermined weight value vector selected by the corresponding subscriber station when the subscriber station and the base station share the identifier of the predetermined weight value vector.

In addition, a pilot signal to be provided to every terminal in the sector is transmitted by using the sector beam shown in FIG. 2 rather than using the switched beamforming method, and the weight value vector for forming the sector beam is a value already known to the base station and the subscriber stations. Therefore, the subscriber station may estimate a channel by using a common pilot signal continuously transmitted from the base station. When it is assumed that the number of the transmitting antennas of the base station is N and the number of the receiving antennas of the subscriber station is 1, a channel estimate estimated by the subscriber station is 1×N, which is given as Math FIG. 2.

$$C=[c_1 c_2 \ldots c_N]$$ [Math FIG. 2]

Therefore, a channel estimate in which the weight value for the sector beam is eliminated is given as Math FIG. 3.

$$H = [h_1 \quad h_2 \quad \ldots \quad h_N], h_i = \frac{c_i}{w_{omni,i}}$$ [Math Figure 3]

Here, $h_i$ denotes a channel between an $i^{th}$ transmitting antenna element and the subscriber station. Since the k weight values $W_k$ are predetermined values for forming the switched beam, the subscriber station may select a switched beam for supplying the maximum received power by using the channel estimate.

Figure 4:
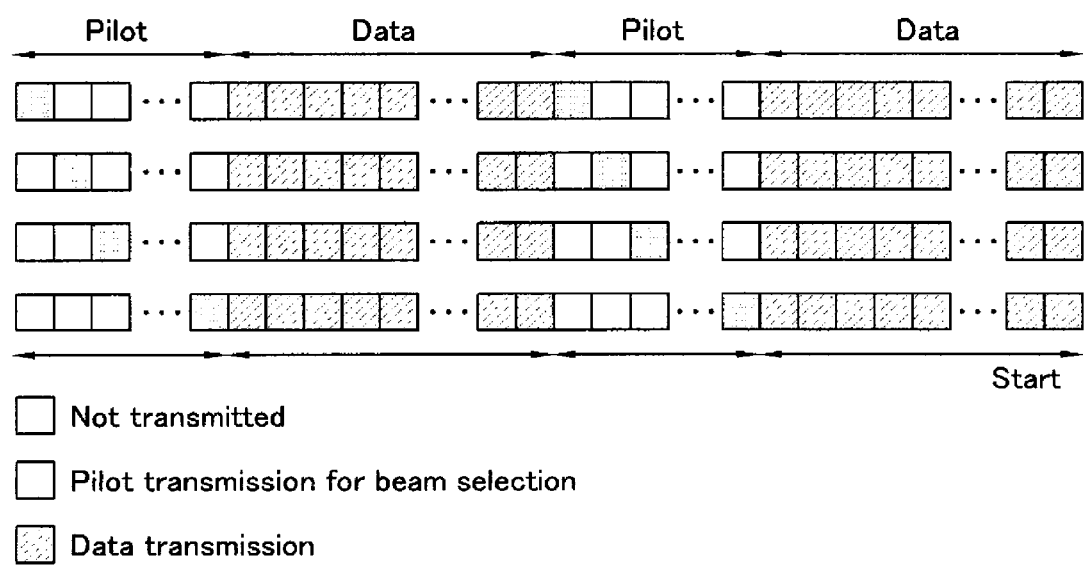
FIG. 4 shows a diagram of a configuration of a pilot signal according to the exemplary embodiment of the present invention in a single carrier transmission method.

That is, a received signal of the subscriber station formed between antenna elements N and indexes k of the downlink switched beam may be given as Math FIG. 4.

$$r=HW_k x+n$$ [Math FIG. 4]

Here, r denotes the received signal, x denotes a transmitting signal, and n denotes noise.

Figure 5:
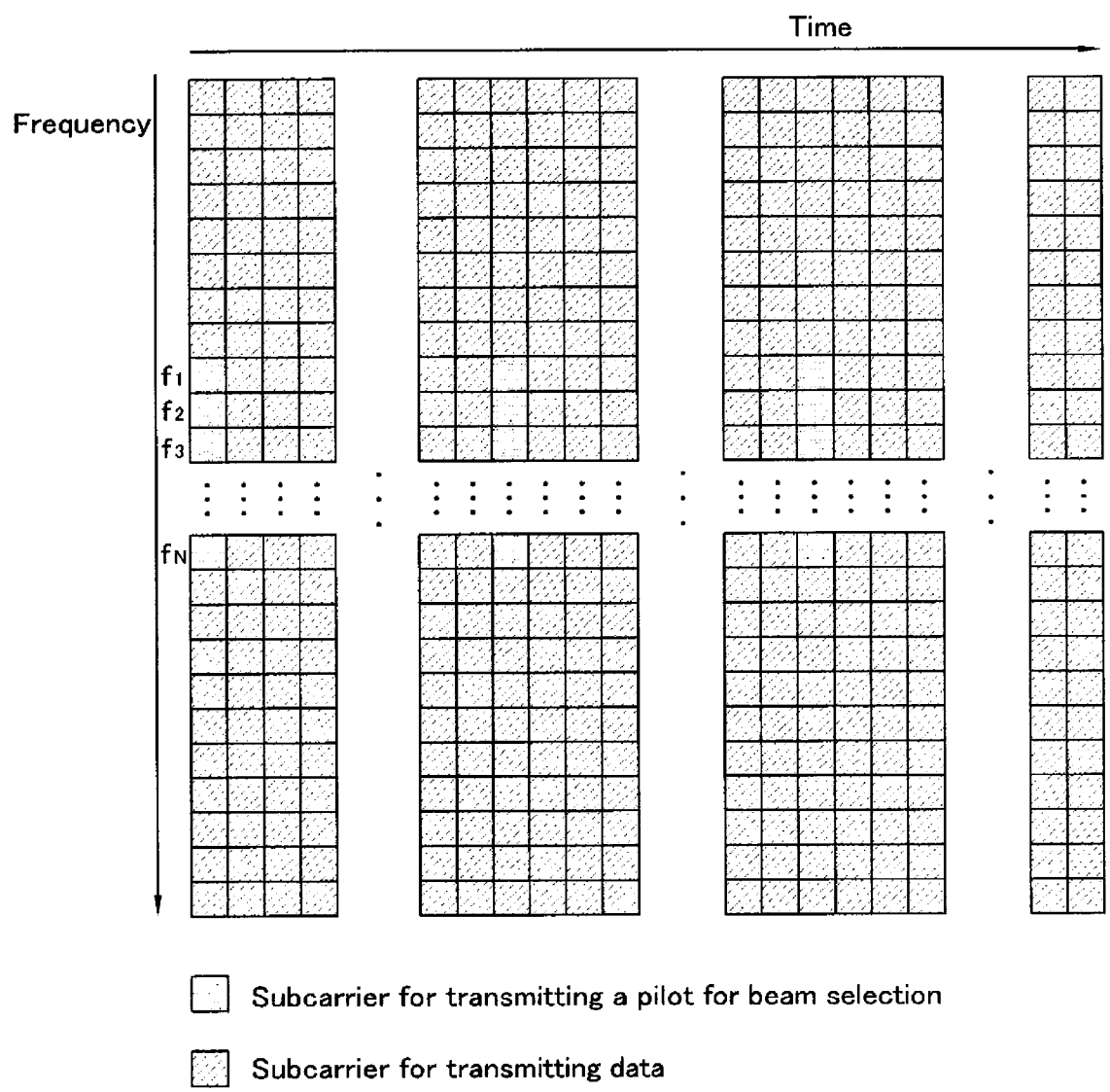
FIG. 5 shows a diagram of a configuration of the pilot signal according to the exemplary embodiment of the present invention in a multi-carrier transmission method.

An instantaneous signal-to-noise ratio (SNR) of the subscriber station is given as Math FIG. 5.

$$\text{SNR} = (W_k^H R W_k), \text{ where } R = H^H H \quad \text{[Math FIG. 5]}$$

Figure 6:
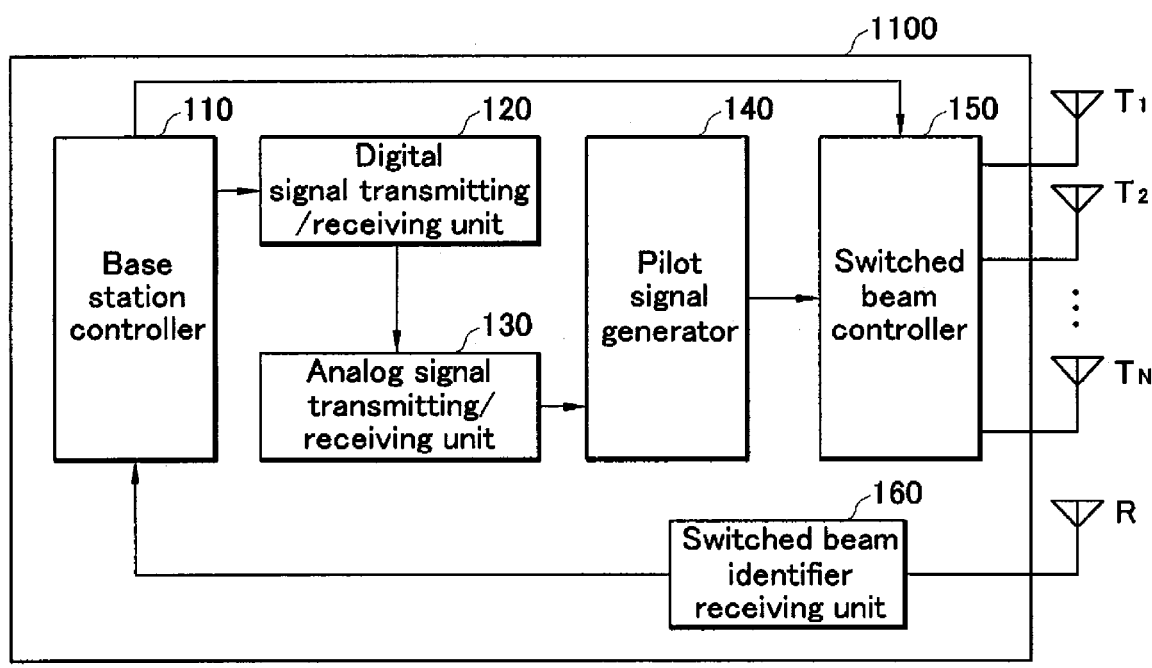
FIG. 6 shows a block diagram of a configuration of the base station according to the exemplary embodiment of the present invention.
Figure 7:
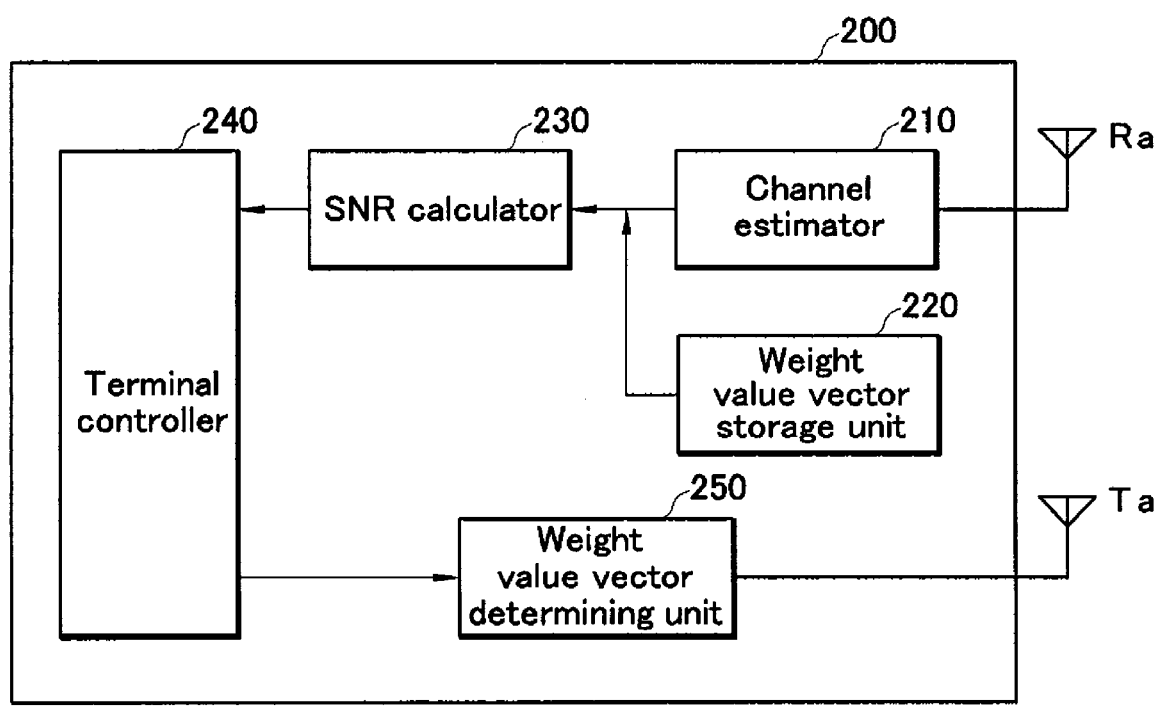
FIG. 7 shows a block diagram of a configuration of the subscriber station according to the exemplary embodiment of the present invention.

That is, the subscriber station may select a beam having a maximum average SNR or a maximum instantaneous SNR as shown in Math FIGS. 6 and 7 by using the channel estimate and the predetermined beamforming weight value vector.

$$\text{Beam Index} = \underset{k}{\operatorname{argmax}} \{W_k^H E[H^H H] W_K\} \quad \text{[Math Figure 6]}$$

$$\text{Beam Index} = \underset{k}{\operatorname{argmax}} \{W_k^H H^H H W_K\} \quad \text{[Math Figure 7]}$$

The weight value vector for forming the switched beam having the maximum average SNR is given as Math FIG. 6, and the weight value vector for forming the switched beam having the maximum instantaneous SNR is given as Math FIG. 7.

In addition, a pilot signal is used to discern the respective transmitting antennas according to the exemplary embodiment of the present invention since it is required to discern the respective transmitting antennas to obtain a value of $H^H H$.

FIG. 4 shows a diagram of a configuration of a pilot signal according to the exemplary embodiment of the present invention in a single carrier transmission method.

As shown in FIG. 4, the respective antenna elements T1, T2, T3, and TN transmit respective pilots for selecting a beam so that respective times for transmitting the pilot signals may not be overlapped. That is, while the antenna element T1 transmits the pilot signal, the other antenna elements do not transmit the pilot signal.

Therefore, the subscriber station may obtain channel estimates for the respective antenna elements.

FIG. 5 shows a diagram of a configuration of the pilot signal according to the exemplary embodiment of the present invention in a multi-carrier transmission method.

In the multi-carrier transmission method such as an orthogonal frequency division multiplexing OFDM method, the respective base station antenna elements transmit the same data at the same time. Here, the base station uses M subcarriers f1, f2, f3, ..., fM at respective predetermined locations of a downlink signal so that the subscriber station may select a beam number. The base station uses N orthogonal codes or N random codes respectively having a length of M so as to discern the transmitting antenna elements.

In an OFDM signal shown in FIG. 5, the M neighboring subcarriers may transmit a Walsh code varied according to the transmitting antenna elements. The antenna element T1 uses the M neighboring subcarriers to transmit a Walsh code #1 having the length of M, and the antenna element TN uses the M neighboring subcarriers to transmit a Walsh code #N having the length of M.

Figure 8:
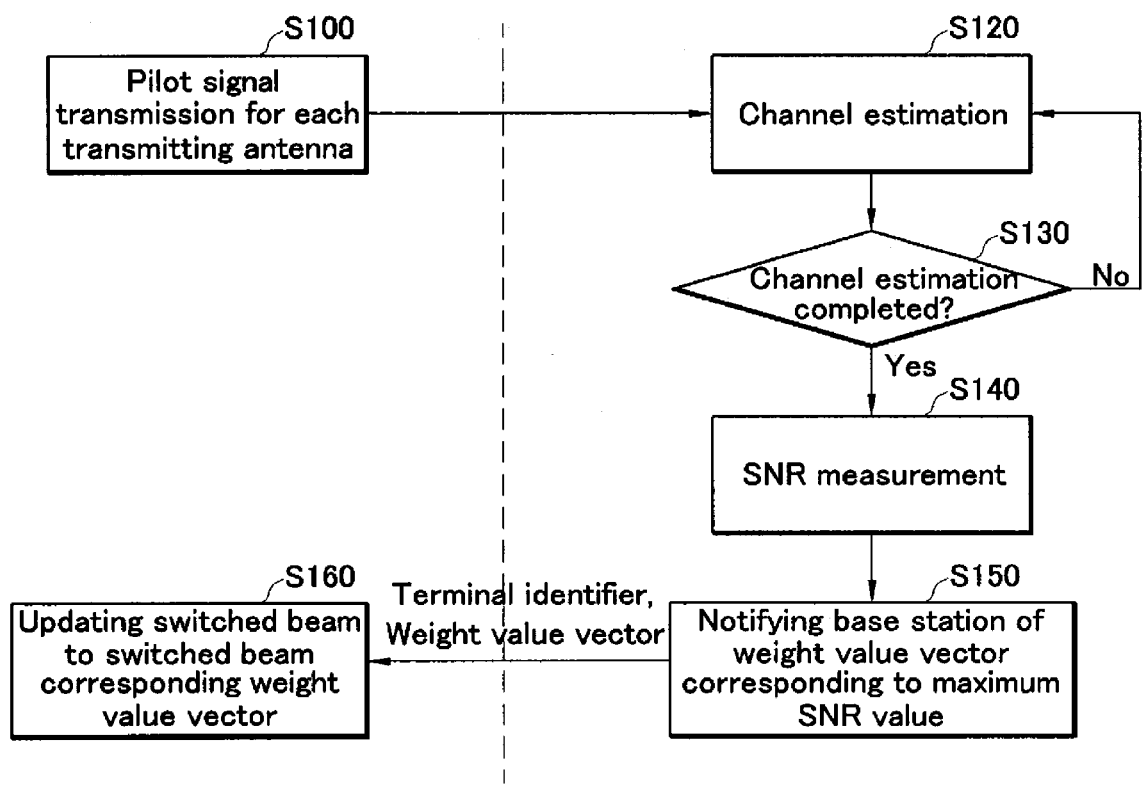
FIG. 8 shows a flowchart for representing a switched beam selecting method according to the exemplary embodiment of the present invention.

When the number M of neighboring subcarriers is increased, the channel is more accurately estimated. A channel for the transmitting antenna k may be estimated as shown in Math FIG. 8.

$$h_k = \frac{1}{M} \sum_{i=1}^{M} \frac{r_i}{W_{omni,k} c_{k,i}} \quad \text{[Math Figure 8]}$$

where k denotes an integer between 1 and N (the number of the transmitting antennas), i denotes an integer between 1 and M (the number of the neighboring subcarriers for discerning the transmitting antennas), $c_{k,i}$ denotes an $i^{th}$ value of the orthogonal code for discerning the transmitting antennas, $r_i$ denotes an $i^{th}$ subcarrier received signal allocated to discern the transmitting antennas.

FIG. 6 shows a block diagram of a configuration of the base station according to the exemplary embodiment of the present invention.

The base station 100 according to the exemplary embodiment of the present invention includes a base station controller 110, a digital signal transmitting/receiving unit 120, an analog transmitting/receiving unit 130, a pilot signal generator 140, a switched beam controller 150, and a switched beam identifier receiving unit 160.

In addition, the base station identifier including a plurality of antenna elements T1, T2, ..., TN for transmitting signals, and a receiving antenna R. While the transmitting antenna and the receiving antenna are illustrated as separated constituent elements, they may be provided as one antenna for transmitting and receiving signals.

The digital signal transmitting/receiving unit 120 encodes source data to a digital signal in an appropriate communication method and policy, and decodes the received digital signal.

The analog signal transmitting/receiving unit 130 modulates the digital signal to an analog signal in the appropriate communication method and policy, and demodulates the received analog signal.

The pilot signal generator 140 generates a pilot signal to be transmitted as a sector beam. When the pilot signal is transmitted through a single carrier, the subscriber station may determine which antenna element transmits the pilot signal since the respective transmitting antenna elements T1, T2, ..., and TN are arranged such that they may not be overlapped. When the pilot signal is transmitted in the OFDM multi-carrier transmission method, the subscriber station may also determine which antenna element transmits the pilot signal since the M neighboring subcarriers are used to transmit the Walsh code or the random code corresponding to the respective antenna elements.

The switched beam controller 150 determines the weight value vectors and whether the beam is transmitted through the plurality of transmitting antenna elements T1, T2, ..., and TN. The weight value vectors include the weight value vector for forming the sector beam and the weight value vector for forming the directional beam as described above.

The switched beam identifier receiving unit 160 receives a switched beam identifier fed back to the receiving antenna R by the subscriber station, and notifies the base station controller 110 of the received switched beam identifier. The switched beam identifier includes weight value vector information on the switched beam for supplying a maximum received power to the subscriber station by calculating the channel estimation and the maximum SNR.

The base station controller 110 controls operations of the digital signal transmitting/receiving unit 120 and the analog signal transmitting/receiving unit 130, and controls an operation of the switched beam controller 150 so that the switched beam controller 150 may form an optimized directional beam by using the weight value vector fed back by the switched beam identifier receiving unit 160.

FIG. 7 shows a block diagram of a configuration of the subscriber station according to the exemplary embodiment of the present invention.

The subscriber station 200 includes a channel estimator 210, a weight value vector storage unit 220, an SNR calculator 230, a weight value vector determining unit 250, and a terminal controller 240.

The channel estimator 210 uses the pilot signal received from the receiving antenna (Ra) to estimate the channel of the respective base station antenna elements. The pilot signal is transmitted to the subscriber station through an omnidirectional sector beam, and the subscriber station uses the weight value vector of the sector beam, i.e., the weight value stored in the weight value vector storage unit 220, to estimate the channel of the respective antenna elements.

The SNR calculator 230 calculates the received SNR by using the channel estimate as shown in Math FIG. 6 and Math FIG. 7. Here, a weight value vector $W_k$ corresponding to the switched beam has been stored in the weight value vector storage unit, and the weight value vector has been known to the base station and the subscriber station.

When the SNR calculator 230 determines the maximum SNR by using the estimated channel and the weight value vector $W_k$, the terminal controller 240 transmits a weight value vector corresponding to the determined maximum SNR to the weight value vector determining unit 250, and the weight value vector determining unit 250 transmits an identifier of the weight value vector corresponding to the determined maximum SNR (i.e., the switched beam identifier) to the base station through a transmitting antenna Ta.

Since the weight value vector of the switched beam is determined and fed back to the base station by the subscriber station according to the exemplary embodiment of the present invention, the base station does not perform an operation for estimating DOA of the uplink signal or an operation for calculating the appropriate weight value vector.

FIG. 8 shows a flowchart for representing a switched beam selecting method according to the exemplary embodiment of the present invention.

The transmitting antenna of the base station transmits a transmitting antenna pilot signal to the subscriber station in step S100 so that the subscriber station may identify the transmitting antenna elements. The pilot signal has the weight value vector of the sector beam, and is transmitted by using a single carrier or a multicarrier so that the transmitting antenna may be identified. In the single carrier transmission method, the pilot signal may be transmitted such that the antenna elements are discerned in a time order. In the multicarrier transmission method, the pilot signal may be transmitted through the neighboring subcarriers such that the antenna elements may be discerned by the Walsh code or the random code.

The subscriber station receiving the pilot signal performs the channel estimation by using the pilot signal in step S120. As described above, since the pilot channel is transmitted through the omnidirectional sector beam, the channel estimate may be obtained by using the weight value vector of the sector beam. Various methods for estimating a channel by using a pilot signal have been disclosed, and a channel estimating method among the various methods may be selected according to a communication method.

The subscriber station determines in step S130 whether channels from all the transmitting antenna elements are estimated, and repeatedly performs the channel estimation until it receives the pilot signals from all the transmitting antenna elements.

When the channels from all the transmitting antenna elements are estimated, SNRs for the respective switched beamforming weight value vectors are measured in step S140 by using the channel estimate and the plurality of predetermined switched beamforming weight value vectors in Math FIG. 6. Since the base station and the subscriber station have been notified of the switched beam weight value vector used for measuring the SNR, the subscriber station may measure the SNR by using the switched beam weight value vector.

In step S150, a maximum value among the SNR estimates for the respective switched beam weight value vector is determined, a weight value vector corresponding to the maximum value is detected, and the base station is notified of an identifier for the weight value vector corresponding to the maximum value along with a terminal identifier. That is, the subscriber station selects the switched beam since the subscriber station feeds back the weight value vector for supplying the maximum received power to the base station.

Since the number of the weight value vectors of the switched beam is limited, the switched beam weight value vector may be transmitted as lesser bit weight value vector identifier.

The base station receiving the weight value vector identifier selects the switched beam according to the weight value identifier, and forms the directional beam directed to the subscriber station until the next feedback interval in step S160.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the exemplary embodiment of the present invention, since the subscriber station selects the switched beam, uplink resources for estimating the DOA and an operation load at the base station are reduced.

In addition, since an error occurring by a distance between the uplink frequency band and the downlink frequency band is eliminated, the optimized switched beam may be efficiently selected.

Further, since the common downlink pilot signal is used, the base station may reduce the uplink radio resources for estimating the DOA, and the subscriber station may select the optimized switched beam for supplying the maximum received power.

What is claimed is:

1. A switched beam selecting method of a subscriber station in a sector area of a base station having a smart antenna system forming a switched beam with a plurality of transmitting antennas, the switched beam selecting method comprising:

receiving a pilot signal that is generated to discern the plurality of transmitting antennas and is transmitted from the base station through a sector beam;

identifying an antenna from which the pilot signal is transmitted based on a code allocated to a neighboring subchannel when the base station employs an orthogonal frequency division multiplexing method, or identifying an antenna from which the pilot signal is transmitted based on a time interval in which the pilot signal is transmitted when the base station employs a single carrier method;

estimating channels for respective transmitting antennas by using the pilot signal;

calculating received signal-to-noise ratios (SNRs) based on respective weight value vectors by using estimates of the estimated channels and a plurality of predetermined weight value vectors for forming the switched beam;

detecting a weight value vector corresponding to a maximum value among the calculated received SNRs;

transmitting an identifier corresponding to the detected weight value vector to the base station; and receiving a signal through a directional beam formed by a switched beam from the base station, the switched beam being generated based on the identifier in the base station.

2. The switched beam selecting method of claim 1, wherein the code allocated to each transmitting antenna is a Walsh code or a random code.

3. The switched beam selecting method of claim 1, wherein the estimating the channel comprises eliminating an effect of an omnidirectional weight value vector allocated to the sector beam.

4. A base station system having a smart antenna system forming a switched beam by using a plurality of transmitting antennas, the base station providing the switched beam to a subscriber station, the base station comprising:

a plurality of transmitting antennas for providing a directional beam that is narrower than a sector beam;

a pilot signal generator for generating a pilot signal to identify the plurality of transmitting antennas;

a switched beam controller for generating the switched beam providing the directional beam according to a predetermined weight value vector;

a switched beam identifier receiving unit for receiving a switched beam identifier transmitted from the subscriber station (an identifier of a weight value vector selected by the subscriber station);

a base station controller for transmitting the pilot signal through the sector beam and controlling the switched beam controller to generate the switched beam based on switched beam identifier information received by the switched beam identifier receiving unit;

a digital transmitting/receiving unit employing an orthogonal frequency division multiplexing method for coding and decoding a digital signal; and an analog signal transmitting/receiving unit employing the orthogonal frequency division multiplexing method for modulating the digital signal to an analog signal and demodulating the received analog signal, wherein the pilot signal generator allocates a code for identifying the transmitting antenna to a neighboring subcarrier to transmit the pilot signal.

5. A base station system having a smart antenna system forming a switched beam by using a plurality of transmitting antennas, the base station providing the switched beam to a subscriber station, the base station comprising:

a plurality of transmitting antennas for providing a directional beam that is narrower than a sector beam;

a pilot signal generator for generating a pilot signal to identify the plurality of transmitting antennas;

a switched beam controller for generating the switched beam providing the directional beam according to a predetermined weight value vector;

a switched beam identifier receiving unit for receiving a switched beam identifier transmitted from the subscriber station (an identifier of a weight value vector selected by the subscriber station);

a base station controller for transmitting the pilot signal through the sector beam and controlling the switched beam controller to generate the switched beam based on switched beam identifier information received by the switched beam identifier receiving unit;

a digital transmitting/receiving unit for coding and decoding a digital signal; and an analog signal transmitting/receiving unit for modulating the digital signal to an analog signal and demodulating the received analog signal, wherein the digital transmitting/receiving unit and the analog transmitting/receiving unit use a single carrier method, and a time interval for identifying the transmitting antenna is allocated to the pilot signal to transmit the pilot signal.

6. A subscriber station for selecting a switched beam transmitted by a base station having a smart antenna system forming the switched beam by using a plurality of transmitting antennas, the subscriber station comprising:

a channel estimator for estimating channels for the respective transmitting antennas of the base station by using a received pilot signal;

a weight value vector storage unit for storing a plurality of weight value vectors for forming a sector beam and the switched beam having directionality that is narrower than the sector beam;

a signal-to-noise (SNR) calculator for calculating received SNRs by using estimates of the estimated channel and the plurality of switched beam weight value vectors; and a weight value vector determining unit for determining a switched beam weight value vector used for estimating a maximum value among the calculated SNRs, and notifying the base station of an identifier of the determined weight value vector;

wherein the subscriber station receives a signal through a directional beam formed by a switched beam from the base station, and the switched beam is generated based on the identifier in the base station, and wherein the channel estimator identifies an antenna from which the pilot signal is transmitted based on a code allocated to a neighboring subchannel when an orthogonal frequency multiplexing method is employed, or identifies the antenna from which the pilot signal is transmitted based on a time interval in which the pilot signal is transmitted when a single carrier method is employed.

7. The subscriber station of claim 6, wherein the channel estimator eliminates an effect of the sector beam weight value vector from the channel estimate with reference to the sector beam weight value vector stored in the weight value vector.

8. The subscriber station of claim 6, wherein identifier information on the switched beam weight value vector is shared by the base station.

* * * * *